(12) United States Patent
Horn et al.

(10) Patent No.: US 11,504,855 B2
(45) Date of Patent: Nov. 22, 2022

(54) SYSTEM, METHOD AND MARKER FOR THE DETERMINATION OF THE POSITION OF A MOVABLE OBJECT IN SPACE

(71) Applicants: Carl Zeiss SMT GmbH, Oberkochen (DE); Carl Zeiss Industrielle Messtechnik GmbH, Oberkochen (DE)

(72) Inventors: Jan Horn, Munich (DE); Nils Haverkamp, Aalen (DE); Marc Schneider, Aalen (DE); Tanja Teuber, Aalen (DE); Lars Omlor, Aalen (DE)

(73) Assignees: Carl Zeiss SMT GmbH, Oberkochen (DE); Carl Zeiss Industrielle Messtechnik GmbH, Oberkochen (DE)

( * ) Notice: Subject to any disclaimer, the term of this patent is extended or adjusted under 35 U.S.C. 154(b) by 556 days.

(21) Appl. No.: 16/712,131

(22) Filed: Dec. 12, 2019

(65) Prior Publication Data

US 2020/0114519 A1    Apr. 16, 2020

Related U.S. Application Data

(63) Continuation of application No. PCT/EP2018/064454, filed on Jun. 1, 2018.

(30) Foreign Application Priority Data

Jun. 20, 2017   (DE) .................... 102017113615.0

(51) Int. Cl.
*G06T 19/20*      (2011.01)
*B25J 9/16*       (2006.01)
(Continued)

(52) U.S. Cl.
CPC ........... *B25J 9/1697* (2013.01); *G01B 11/002* (2013.01); *G06T 7/74* (2017.01); *G06T 2207/30204* (2013.01)

(58) Field of Classification Search
None
See application file for complete search history.

(56) References Cited

U.S. PATENT DOCUMENTS 10,504,230 B1 * 12/2019 Stahl ..................... G06T 7/10
10,878,591 B2 * 12/2020 Meess ................... G09B 19/24
(Continued)

FOREIGN PATENT DOCUMENTS

CN    103217272 A    7/2013
CN    106247932 A    12/2016
(Continued)

OTHER PUBLICATIONS

European Office Action, with translation thereof, for corresponding EP Appl No. 18 728 879.0, dated Feb. 4, 2022.
(Continued)

*Primary Examiner* — Cai Y Chen
(74) *Attorney, Agent, or Firm* — Fish & Richardson P.C.

(57) ABSTRACT

A system for determining the position of a movable object in space includes a marker which is to be applied to the object. The marker has a surface which is subdivided into a plurality of individual fields. The fields each have a statistical noise pattern. The system also includes an image capture unit which is remote from the object and is arranged to capture an image of the marker. The system further includes an image evaluation unit which stores a reference image of the noise patterns and is designed to locate at least one of the fields in the currently captured image of the marker by comparison with the reference image in order to determine a current position of the marker in space. There are corresponding methods for determining a position the object.

23 Claims, 5 Drawing Sheets

(51) Int. Cl.
*G06T 7/73* (2017.01)
*G01B 11/00* (2006.01)

(56) References Cited

U.S. PATENT DOCUMENTS

2008/0100622 A1 5/2008 Gordon
2018/0354130 A1 12/2018 Presinger et al.

FOREIGN PATENT DOCUMENTS

| CN | 106464581 A | 2/2017 | |
|---|---|---|---|
| DE | 10 2009 009 372 A | 8/2010 | |
| DE | 10 2015 212 352 A1 | 1/2017 | |
| EP | 1473549 A1 | 11/2004 | |
| EP | 3719441 A1 * | 10/2020 | ........... G01B 11/005 |
| JP | H06203166 | 7/1994 | |
| WO | WO 2017/072281 | 5/2017 | |

OTHER PUBLICATIONS

Translation of International Preliminary Report on Patentability for corresponding PCT Appl No. PCT/EP2018/064454, dated Dec. 24, 2019.
Translation of International Search Report for corresponding PCT Appl No. PCT/EP2018/064454, dated Oct. 22, 2018.
Chinese Office Action, with translation thereof, for corresponding CN Appl No. 201880048659.0, dated Mar. 22, 2021.
German Office Action, with translation thereof, for corresponding 10 2017 113 615.0, dated Apr. 19, 2022.
Fridtjof Stein: Efficient Computation of Optical Flow Using the Census Transform, Proceedings of the 26th DAGM Symposium, 2004, pp. 79-86.
Bi et al., "Nan-Pattern Recognition and Correlation Technique for Sub-Nanometer In-Plane Displacement Measurement," *Experimental Mechanics*, vol. 50, Feb. 24, 2010, pp. 1169-1181.
Chinese Office Action, with translation thereof, for corresponding CN Appl No. 201880048659.0, dated Jun. 6, 2022.

* cited by examiner

SYSTEM, METHOD AND MARKER FOR THE DETERMINATION OF THE POSITION OF A MOVABLE OBJECT IN SPACE

CROSS-REFERENCE TO RELATED APPLICATIONS

The present application is a continuation of, and claims benefit under 35 USC 120 to, international application PCT/EP2018/064454, filed Jun. 1, 2018, which claims benefit under 35 USC 119 of German Application No. 10 2017 113 615.0, filed on Jun. 20, 2017. The entire disclosure of these applications are incorporated by reference herein.

FIELD

The disclosure relates to a system for determining the position of a movable object in space. The disclosure also relates to a method for determining the position of a movable object in space. The disclosure furthermore relates to a marker for determining the position of a movable object in space.

BACKGROUND

There are a wide variety of industrial applications in which accurate position determination is involved to control the movement of an object. Such an object may be, for example, a robot arm, for example in mirror production, the six-dimensional (6D) position of which is desirably accurately known and controlled. Other application examples relate to the 6D position control of movable mirrors, for example in a projection exposure apparatus, in order to generate a precise image of a reticle structure on the semiconductor substrate to be exposed. Such position control systems are often based on conventional sensors such as optical encoders, capacitive sensors, eddy current sensors.

Within the scope of the present disclosure, a position of an object in space is understood to mean a position according to N degrees of freedom of movement, where N may be 2, 3, 4, 5 or 6. By way of example, a 6D position is a position of the object in space according to 3 degrees of freedom of translation and 3 degrees of freedom of rotation. Consequently, the term position also comprises an orientation of the object in space.

On account of the improved performance of image sensors in recent years, a position can also be determined by capturing an image of the object using one or more cameras. DE 10 2009 009 372 A1 proposes an apparatus and a method for monitoring the orientation of at least one mirror, for example in a microlithographic projection exposure apparatus, in which a capture device having a camera captures a pattern which is provided by a pattern source using spatial and/or temporally variable light sources which are reflected onto the capture device by the mirror. The orientation of the mirror can be determined from the mirror image captured by the capture device. According to the document, the pattern provided by the pattern source may be a noise pattern, that is to say a pattern generated by a random process, for example surface regions of components in the vicinity of the mirror to be monitored, for example coated or structured surfaces of the housing of a projection exposure apparatus or the like. Different image or pattern recognition methods or comparable methods, in particular correlative methods, can be used for the pattern comparison, that is to say the comparison of the pattern imaged in the capture device with the original pattern.

SUMMARY

Although the present disclosure can also be used in applications in which very accurate position determination in the submicrometer range or even in the subnanometer range is involved, the present disclosure is suitable, in particular, for determining the position of a movable object in a large working volume, for example of a size of 1 m$^3$, and with large working distances between the measurement system and the object.

The disclosure seeks to provide a system and a method for determining the position of a movable object in space, which make it possible to determine the position as accurately and reliably as possible, in particular in large working volumes with large distances between the measurement system and the object.

The disclosure provides a system for determining the position of a movable object in space, having a marker which is to be applied to the object and has a surface which is subdivided into a plurality of individual fields, wherein the fields each have a statistical noise pattern, also having an image capture unit which is remote from the object and is arranged to capture an image of the marker, and having an image evaluation unit which stores a reference image of the noise patterns and is designed to locate at least one of the fields in the currently captured image of the marker by comparison with the reference image in order to determine a current position of the marker in space.

The disclosure also provides a method for determining the position of a movable object in space, having the steps of: providing a marker having a surface which is subdivided into a plurality of individual fields, wherein the fields each have a statistical noise pattern; storing a reference image of the noise patterns; applying the marker to the object; capturing a current image of the marker on the object; and evaluating the currently captured image of the marker, wherein at least one of the fields of the marker is located in the currently captured image by comparison with the reference image in order to determine a current position of the marker in space.

The system and method according to the disclosure can be implemented in a camera-based manner, in particular. The system and the method use a marker which is applied to the object in order to determine the position of the object by capturing an image of the marker. The marker is two-dimensional and is subdivided into a plurality of individual fields each having a statistical noise pattern. The noise patterns can be different from one another, or else identical. If they are different, they can be detected by the image evaluation unit via a correlative method, for example. It goes without saying that the system and the method can use not only one marker, but also a plurality of markers which are each applied to the object at different locations and are each subdivided into a plurality of individual fields with different noise patterns. It likewise goes without saying that the image capture system can have, for example, a plurality of cameras, in particular if the object has a large number of degrees of freedom of movement, for example can rotate through 360° about an axis, as may be the case, for example, in a robot arm of a machine.

Depending on the position of the movable object and therefore of the marker, the image of the marker is captured at a different viewing angle of the image capture unit which is preferably fixed in space, which results in geometrically different images of the pattern. In other words, the marker is subjected to a temporally changing projection transformation if it is imaged onto an image sensor, for example. A reference image of the noise patterns is stored in the image evaluation unit, wherein the reference image represents, for example, the "undistorted" plan view of the marker. The image evaluation unit is now designed to compare the current image of the marker with the reference image in order to determine a current position of the marker and therefore of the object from the comparison.

As a result of the fact that the marker, which is preferably flat, that is to say not curved, has a plurality of individual fields each having a statistical noise pattern, the computing complexity during image evaluation can be reduced and the image evaluation can be considerably improved with regard to the precision with which the position of the marker and therefore of the object is determined.

The system according to the disclosure and the method according to the disclosure fundamentally make it possible to determine the N-dimensional position of the marker, from which the N-dimensional position of the object can be determined. In this case, N can be in the range of 2 to 6.

The noise patterns are preferably such that the noise has a high bandwidth in the frequency domain.

This makes it possible to locate the individual fields of the marker in the image of the marker in a particularly precise manner. The higher the frequency bandwidth of the noise, the more accurately the individual fields of the marker can be located.

The noise patterns of the individual fields are preferably different from field to field, in particular are at least approximately uncorrelated.

A very narrow autocorrelation function, which is ideally a $\delta$ or Dirac function, yet further increases the accuracy with which the position of the marker and therefore of the object is determined. As a result, the method and the system are suitable, in particular, for correlation-based image evaluation methods in order to exactly locate at least one or more of the individual fields in the currently captured image of the marker.

The noise patterns are preferably grayscale patterns, in particular having a probability density of grayscale values which is a Gaussian distribution. The grayscale patterns may be generated, for example, as black-and-white pixel patterns in a random process. A Gaussian probability density function or distribution of the grayscale values has the advantage of maximum entropy and therefore a maximum information content for a given standard deviation. The given standard deviation relates to the grayscale range (intensity range) of the image capture unit. The power density of the noise can be selected, for example, in such a manner that the $3\sigma$ value of the Gaussian distribution fits into the grayscale range of the image capture unit. The noise patterns preferably contain white noise which as such has a very narrow autocorrelation function. The narrower the autocorrelation function, the better correlation-based algorithms can locate the noise patterns. White noise has a $\delta$ or Dirac function as the autocorrelation function.

The degree to which the surface of the marker is filled or occupied with noise patterns should be as high as possible in the sense of position determination which is as exact as possible.

In another preferred configuration, the fields of the marker are polygonal, in particular rectangular, in particular square.

In this configuration, the individual fields of the marker are bounded with straight lines. The surface of the marker itself is also preferably bounded in a polygonal manner, in particular in a rectangular manner, in particular in a square manner. The straight-line boundary of the fields of the marker and/or of the marker itself has the advantage that, when evaluating the current image of the marker, the projection parameters can be coarsely determined and the fields of the marker can be coarsely located first of all with little computing complexity, as a result of which it is possible to reduce the computing complexity during the subsequent search for the exact projection parameters or during fine localization of the fields by evaluating one or more of the imaged noise patterns.

The fields of the marker can be arranged in the form of a matrix in rows and columns and can each have the same orientation with respect to one another in this case.

However, it is also possible to arrange the fields of the marker in a manner rotated and/or offset relative to one another in order to eliminate ambiguities when coarsely determining the orientation of the marker and/or of the fields in the current image of the marker. For example, in the case of rectangular or square fields, the individual fields can each be rotated through an angle of rotation relative to one another, with the result that none of the fields has the same orientation as one of the other fields.

Such ambiguities can likewise be avoided with more than quadrangular fields, generally multiangular fields, or with fields having a different number of corners.

However, it is also possible for the individual fields of the marker to be circular or elliptical.

In order to achieve the highest possible degree of filling of the surface of the marker with noise patterns in the case of circular fields, provision may be made for the circular fields to be offset with respect to one another in such a manner that the surface of the marker is occupied as densely as possible by the circular fields.

As already mentioned above, it is advantageous to coarsely determine the position of the marker in advance on the basis of the captured image of the marker. In this context, the image evaluation unit is preferably designed to coarsely determine the position of the marker currently captured by the image capture unit by detecting corners and/or edges of the marker and/or of the fields of the marker.

Additionally or alternatively, it is also possible to calculate a Radon/Hough transform which is a robust method for detecting straight lines, circles or any desired other parameterizable geometrical figures in a grayscale image. As already mentioned, coarsely determining the position of the marker has the advantage that the computing complexity for the subsequent exact position determination is reduced.

In connection with the above-mentioned measure, the image evaluation unit is preferably designed to finely determine the position of the marker currently captured by the image capture unit by detecting the noise patterns in comparison with the stored reference image of the noise patterns.

The fine determination can be carried out, for example, by calculating a number of parameter sets for one or more noise patterns. It is then possible to calculate a similarity measure, for example a merit function, for each of the adopted parameter sets by comparing the reference image (which is modified/distorted and/or shifted with the adopted parameters) with the corresponding currently captured image of the marker. That parameter set which achieves the highest similarity (or the lowest non-similarity) is the parameter set which ultimately precisely locates the field(s) of the marker.

However, the (normalized) correlation coefficient can also be used as the similarity measure. The normalized correlation coefficient likewise makes it possible to assess the current correspondence quality, that is to say how well/reliably the currently evaluated field has been located.

In order to reduce the computing complexity, it is likewise possible to choose an approach in which the search for the parameter set which unambiguously locates the relevant field of the marker is first of all carried out on the basis of a lower-resolution image of the noise pattern(s) and the search is then refined on the basis of the higher-resolution image. It is therefore possible to limit search areas in the higher-resolution image and to reduce the computing complexity.

In another preferred configuration, the image capture unit has a low-pass filter or a defocusing device.

Although it is advantageous and preferred to provide the noise patterns of the fields of the marker in such a manner that the noise has a very high bandwidth in order to make it possible to locate the individual fields as exactly as possible, it can be advantageous and advisable to reduce the bandwidth of the noise in the noise patterns by using a low-pass filter during image capture in order to avoid so-called "aliasing" effects. "Aliasing" can occur if the image currently captured by the image capture unit has severe projection distortion, for example if the camera is looking at the surface of the marker under grazing incidence. In this situation, it may be the case that parts of the captured image are sampled at a very low spatial sampling rate. This may result in the fields of the marker being incorrectly located, which in turn can greatly distort the determination of the position and/or orientation of the marker and therefore of the object.

Instead of a low-pass filter in the beam path of the image capture unit, provision may also be made for the optics of the image capture unit to be defocused in a targeted manner.

It is particularly advantageous if the noise patterns are generated during the production of the marker or the production of the noise patterns by subjecting white noise to low-pass filtering. This has the advantage that there is better control over the filtering when producing the marker than if the filtering is carried out by optics in the beam path of the image capture unit. This is because it is possible to find a good compromise between the highest possible bandwidth of the noise patterns and sufficient low-pass filtering during the low-pass filtering of white noise when generating the noise patterns during the production of the marker in order to keep the autocorrelation function of the noise patterns as narrow as possible, on the one hand, and to avoid, as far as possible, or to at least reduce aliasing effects, on the other hand.

When determining the position of objects which have a large range of movement and in which images of the marker which have severe projection distortion are accordingly also captured by the image capture unit, it is advantageous to use a plurality of cameras and/or a plurality of markers in the system and the method at least for some degrees of freedom of movement, with the result that at least one camera always observes at least one marker with projection distortion which is still acceptable.

Both the system according to the disclosure and the method according to the disclosure can be used to determine the position and/or orientation of any desired movable objects. The object may be, in particular, a movable machine part, in particular a robot arm of a machine as is used in the production of mirrors or other optical components.

However, the movable object may also be a movable component of an optical system itself, in particular a component of a microlithographic projection exposure apparatus. For example, the movable component may be a movable mirror.

However, the disclosure can also be used in other fields, for example in medical technology, robot-assisted surgery, etc.

The disclosure also provides a marker for determining the position of a movable object in space, the features and preferred configurations of which have already been described above with respect to the method according to the disclosure and the system according to the disclosure.

Further advantages and features are gathered from the following description and the attached drawing.

It goes without saying that the aforementioned features and those yet to be explained below may be used not only in the respectively specified combination but also in other combinations or on their own, without departing from the scope of the present disclosure.

BRIEF DESCRIPTION OF THE DRAWINGS

Exemplary embodiments of the disclosure are illustrated in the drawing and described in more detail below with reference thereto. In the figures.

DESCRIPTION OF EXEMPLARY EMBODIMENTS

Figure 1:
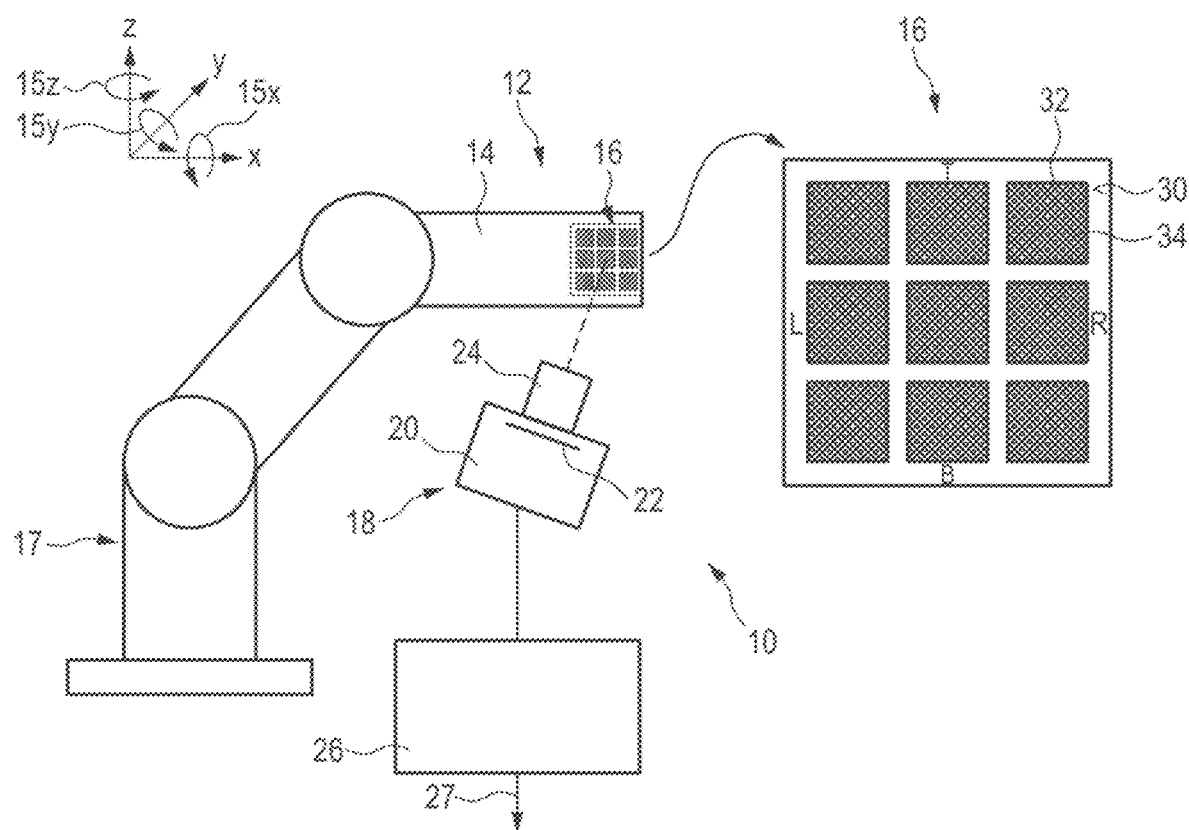
FIG. 1 shows an exemplary embodiment of a system for determining the position of a movable object in space, wherein the object is, by way of example, a robot arm of a machine, and a first exemplary embodiment of a marker for determining the position.

FIG. 1 schematically shows a system for determining the position of a movable object 12 in space, which system is provided with the general reference sign 10. In the exemplary embodiment shown, the object 12 is a robot arm 14 of a machine 15. The robot arm 14 is movable, for example translationally movable and rotationally movable. The current location of the robot arm 14 can be expressed, for example, in Cartesian coordinates x, y, z, and the current orientation can be expressed as an angle of rotation about one or more of the axes x, y, z. The system 10 is fundamentally able to determine the position of the object 12 in space according to 6 degrees of freedom of movement, that is to say in a 6-dimensional manner. The working volume of the robot arm can be large, for example 1 m$^3$ or more. FIG. 1 shows, by way of example, a coordinate system having x, y and z axes, wherein arrows 15x, 15y and 15z illustrate the degrees of freedom of rotation of the object 12 about the x, y and z axes.

The system 10 has a marker 16 which is applied to the object 12. The marker 16 is stationary with respect to the object 12, that is to say it concomitantly moves with the object when the object 12 moves.

The system 10 also has an image capture unit 18 remote from the object 12. The image capture unit 18 comprises a camera 20 which is, for example, a video camera and is equipped with an image sensor 22. The image sensor 22 may be in the form of a commercially available image sensor.

The camera 20 is arranged to capture an image of the marker 16, wherein the camera regularly or continuously captures images of the marker 16 in chronological order, with the result that the changing positions of the object 12 can be permanently tracked. The camera 20 also has a lens 24 which images the marker 16 onto the image sensor 22.

The camera 20 can be arranged in a manner fixed in space at least during operation of the system 10. However, the camera 20 may also be movable.

The system 10 also has an image evaluation unit 26 which is connected to the image capture unit 18 and is used to evaluate the image of the marker 16, as captured by the camera 20, for the purpose of determining the current position of the marker 16 and therefore of the object 12.

While the system 10 has been shown with only one camera 20 and one marker 16 in FIG. 1 for reasons of simplicity, it is understood that the system 10 may comprise a plurality of cameras 20 and a plurality of markers 16. In this case, the plurality of markers 16 can be applied to the object 12 at different positions and the cameras 20 can be distributed in space such that the cameras 20 observe the marker(s) 16 at different viewing angles.

The system 10 can be in the form of a pure measurement system for tracking the movements of the object 12, but can also be used to control or regulate the movement of the object 12.

Figure 2:
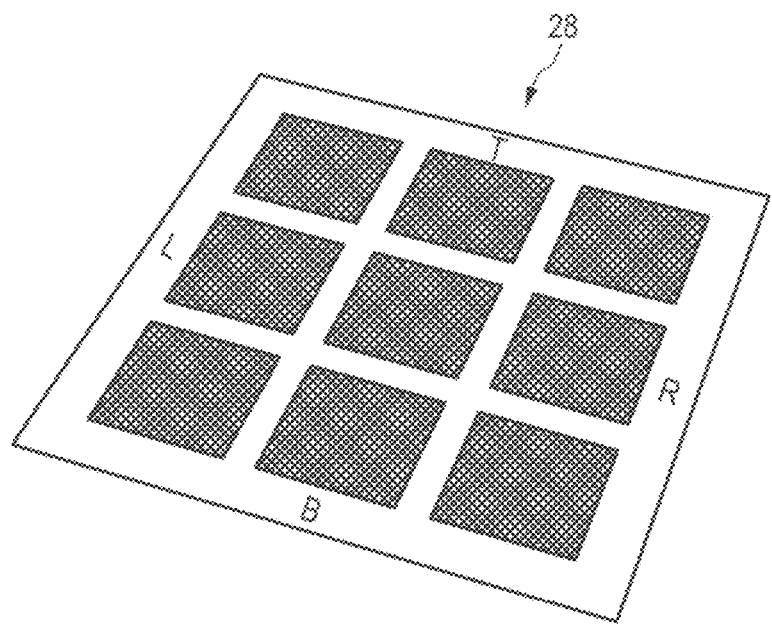
FIG. 2 shows an exemplary image of a marker applied to the robot arm in FIG. 1, which image is captured by an image capture unit of the system in FIG. 1.

Depending on the position of the object 12 in space, an image of the marker 16 having greater or less projection distortion is produced on the image sensor 22 of the camera 20. FIG. 2 shows, by way of example, such an image 28 of the marker 16 in FIG. 1 having projection distortion. The aim is now to determine the exact position of the object 12 from the image 28 of the marker 16 by determining the position of the marker 16 in the coordinate system of the camera 20. In the practical embodiment of the system 10, aspects such as camera calibration and aberrations of the camera 20 are taken into account, but this is not necessary for understanding the present disclosure. For understanding the disclosure, it is sufficient to consider the camera 20 as a pinhole camera.

The result of the position determination by the image evaluation unit 26 is output by the image evaluation unit 26, as indicated with an arrow 27 in FIG. 1, for example to a display which is not illustrated or to a control or regulation system for controlling/regulating the movement of the object 12.

In FIG. 1, the marker 16 is additionally illustrated on its own and in an enlarged form. "T" is used to denote the upper end of the marker 16, "L" is used to denote the left-hand end, "R" is used to denote the right-hand end and "B" is used to denote the lower end of the marker 16.

The marker 16 is two-dimensional. The marker 16 is preferably flat. A surface 30 of the marker 16 is square in the exemplary embodiment shown in FIG. 1. Other surface shapes such as generally rectangular, generally polygonal, in particular multiangular, can likewise be considered. The surface 30 is subdivided into a plurality of fields 32, wherein a total of nine fields 32 of this type are present in the exemplary embodiment in FIG. 1. However, the number of fields 32 is not critical. It may be less than or greater than 9. The fields 32 are likewise square in the exemplary embodiment shown in FIG. 1. However, the fields 32 may also be generally rectangular or generally polygonal.

The arrangement of the fields 32 is in the form of a matrix in rows and columns in the exemplary embodiment shown in FIG. 1, in which case the individual fields 32 each have the same orientation or rotational position with respect to one another.

Each of the fields 32 is filled with a statistical noise pattern 34. In FIGS. 1, 2, 5 to 9, the noise patterns 34 are shown as regular patterns which are identical to one another for reasons of simplified illustration. However, it goes without saying that the noise patterns 34 have been generated by a stochastic process and therefore do not have any dominant periodicity and are also irregular. In addition, the noise patterns may be identical to one another. However, the noise patterns 34 may advantageously also be completely different from one another from field 32 to field 32. In other words, the noise patterns 34 can be unique with respect to one another. A practical implementation of an individual noise pattern 34 is shown in FIG. 4.

The noise patterns 34 fill the surface 30 of the marker 16 as far as possible with a high degree of filling.

Figure 4:
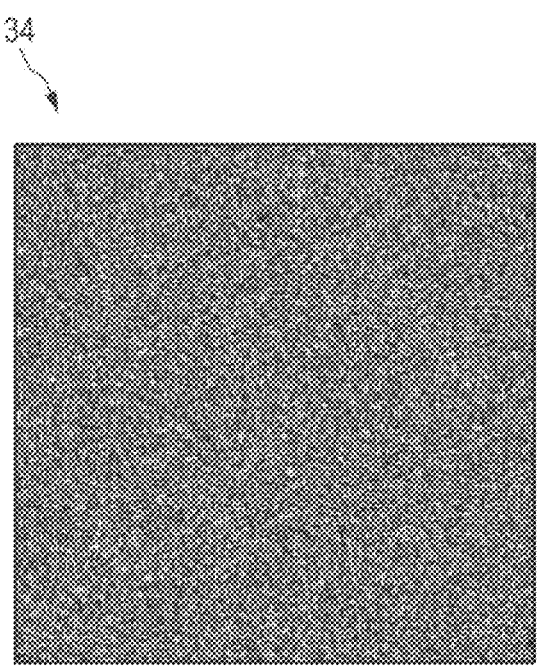
FIG. 4 shows a practical example of an individual noise pattern of the marker in FIG. 1.

The noise patterns 34 are preferably in the form of grayscale patterns, as shown by way of example in FIG. 4. The noise patterns 34 preferably have a bandwidth which is as high as possible in the (spatial) frequency domain. The noise patterns 34 are generated when producing the marker 16 and are stored as a reference image in the image evaluation unit 26.

The cross-correlation function of all noise patterns 34 of the marker 16 is preferably as small as possible, that is to say the noise patterns 34 are preferably at least approximately uncorrelated from field to field 32.

The noise patterns 34 preferably contain broadband white noise having a maximum possible signal value. The maximum signal value here means that the image sensor 22 of the camera 20 does not run into the black or white limit, but rather the grayscale range (intensity range) of the image sensor 22 is fully used. As already mentioned, the surface 30 of the marker 16 should be filled with the white noise to the maximum possible extent.

White noise has a narrow autocorrelation function. The narrower the autocorrelation function, the better correlation-based algorithms can locate the noise patterns 34. White noise has a δ peak as the autocorrelation function. This is the narrowest autocorrelation function which is possible. White noise should therefore be given preference for correlation-based localization algorithms.

Furthermore, the grayscale values of the noise patterns have a Gaussian distribution. A Gaussian probability density function (distribution of the grayscale values) has the maximum entropy and therefore the maximum information content for a given standard deviation. The given standard deviation relates to the grayscale range (intensity range) of the camera 20. The power of the noise can be selected, for example, in such a manner that the 3σ value of the Gaussian distribution fits into the grayscale value (intensity value) range of the camera.

A noise pattern which is well-suited to correlation-based localization algorithms is not necessarily always but usually also suitable for other localization algorithms.

Figure 3:
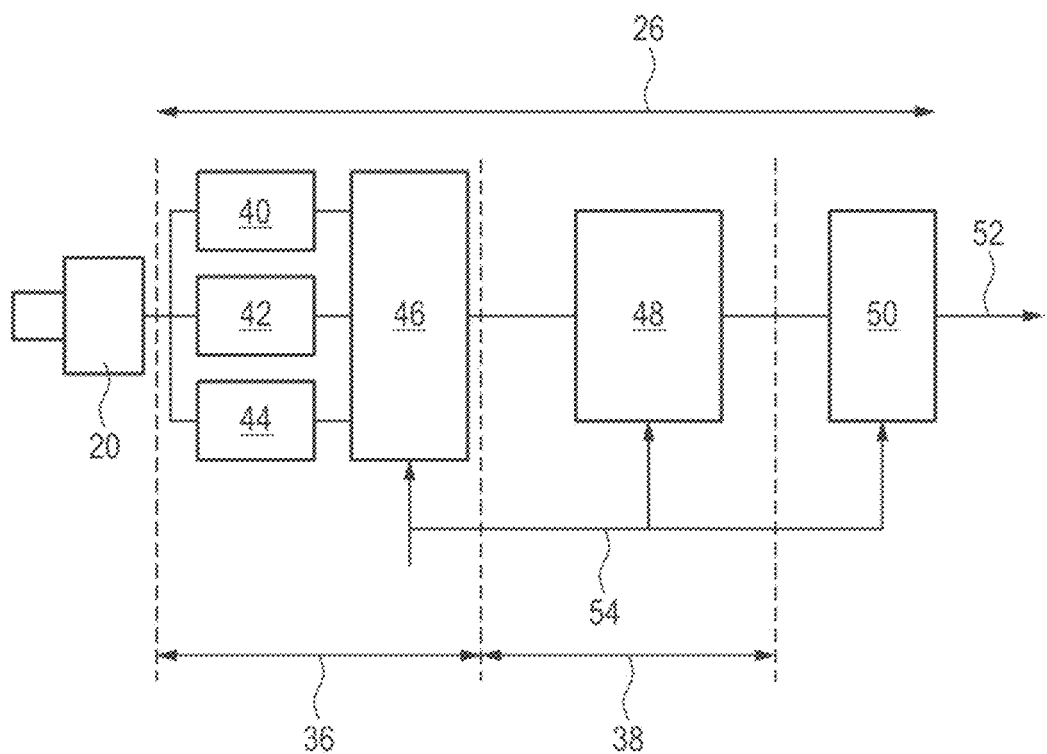
FIG. 3 shows a block diagram illustrating an exemplary embodiment of a method for determining the position of a movable object in space via the system in FIG. 1.

An exemplary embodiment of the image evaluation unit 26 and a method of how the image evaluation unit 26 evaluates the image of the marker 16 currently captured by the camera 20 in order to determine the position of the marker 16 in space and therefore of the object 12 in space therefrom are described with reference to FIG. 3.

The processes taking place in the image evaluation unit 26 are preferably subdivided into two superordinate process steps 36 and 38, wherein the process step 36 takes place first of all.

The first process step 36 is a coarse determination which is used to coarsely locate the marker 16 and the fields 32 of the marker 16. The coarse determination is carried out on the basis of the currently captured image of the marker in the camera 20. This can be carried out, for example, by detecting edges 40 of the marker 16 and/or of the fields 32 of the marker 16, by detecting corners 42 of the marker 16 and/or of the fields 32 of the marker 16 and/or by calculating 44 a Radon/Hough transform. The steps 40, 42 and 44 can be efficiently implemented, for example, on an FPGA (field programmable gate array, that is to say an integrated digital technology circuit into which a logical circuit can be loaded). The items of information from the steps 40, 42 and 44 are linked to one another in an information fusion step 46 in order to obtain improved localization information therefrom still within the scope of the coarse determination of the position of the marker 16. The information fusion step 46 or a part of the latter can be carried out on a microprocessor in software. This is because the analyses of the edge detection 40, the corner detection 42 and the Radon/Hough transform result in a moderate number of coordinates of points and/or a list containing parameterized lines instead of a large quantity of image data.

Coarse projection parameters and a coarse location of the fields 32 of the marker 16 result from the coarse determination.

After the coarse determination 36, a fine determination 38 which is used to finely locate the fields 32, in particular, is carried out. The advantage of a coarse determination in advance of the fine determination is that the search areas for finely locating the fields 32 can be limited. This advantageously reduces the computing time.

The fine determination 38 comprises a fine adjustment 48 of the noise patterns 34 of the marker 16 on the basis of the currently captured image of the marker 16 and the reference image of the noise patterns 34 which is stored in the image evaluation unit 26. The fine determination 38 results in precise projection parameters and precise locations of the fields 32 of the marker 16.

Finally, in a step 50, the position of the marker 16 in space and therefore of the object 12 in space is calculated. The result is then output according to an arrow 52.

Within the scope of the entire image evaluation or in a part of the image evaluation, it is also possible to use movement information from previous images of the marker 16, specifically in the steps 46, 48 and 50, as indicated with the reference sign 54. The movement information from previously captured images of the marker 16 can be used to reduce computing times by further limiting search areas or to improve the tracking of the movement of the object 12 through the system 10.

If the position of the marker 16 is coarsely determined without evaluating the noise patterns 34, for example only on the basis of corner and/or edge detection of the marker 16 and/or of the fields 32, there is ambiguity with respect to a rotation of the marker 16 through 90° in each case in the exemplary embodiment of the marker 16. The cause of this is the strictly symmetrical and regular arrangement of the fields 32 having the same size and as squares with the same orientation.

Figure 5:
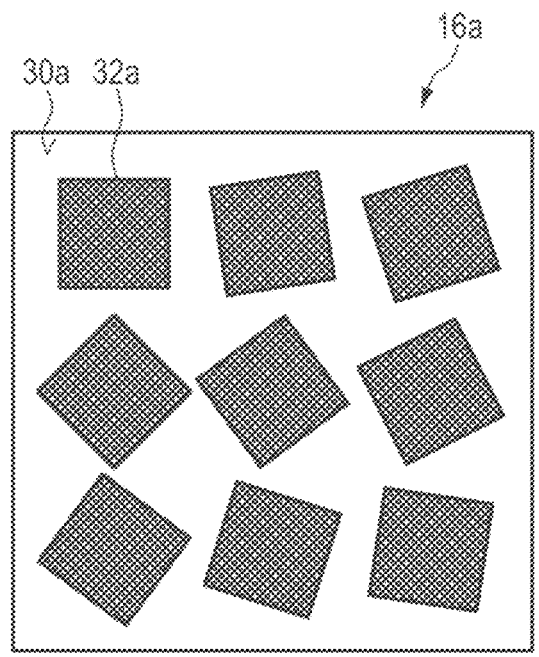
FIG. 5 shows another exemplary embodiment of a marker for determining the position of a movable object.

FIG. 5 shows an exemplary embodiment of a marker 16a in which this ambiguity is avoided. In the marker 16a, the fields 32a are all oriented differently with respect to one another. In the example shown with nine fields 32a, the fields 32a can be rotated through 9° with respect to one another from field to field, for example. This eliminates the ambiguity with respect to a 0° rotation of the marker 16a or with respect to rotations of the marker 16a through integer multiples of 90°. This makes it possible to unambiguously identify the orientation of the marker 16a already in the coarse determination phase according to FIG. 3 without evaluating the noise patterns 34. For example, the upper left-hand corner of the marker 16a can always be identified since the edges of the field 32a run parallel to the outer edges of the marker 16a only with respect to the left-hand upper field 32a.

A further possible way (not illustrated) of avoiding ambiguities during the coarse determination via edge and corner detection is for the fields 32 of the marker 16 to have multiangular polygonal structures.

Examples of how the fine determination 38 and therefore the precise determination of the position of the marker 16 in space can be carried out on the basis of an evaluation of the noise patterns 34 in the image of the marker 16 captured by the image capture unit 16 are described below.

The fine determination is used to locate the fields 32 and is carried out by evaluating the noise patterns 34 in the camera image. The fine localization of the fields 32 can be implemented, for example, via an approach in which the parameter space (position parameters) is searched within the scope of a full search, that is to say completely. However, since there is prior knowledge from the coarse determination according to process step 36, the size of the search areas in the parameter space can be limited, which also limits the computing time.

A full search means, in principle, processing the noise patterns 34 with a number of adopted parameter sets and therefore respectively generating an artificial camera image with the respectively adopted parameters. A similarity measure (merit function) is then calculated for each of the adopted (searched) parameter sets by comparing the reference image of the noise patterns (master patterns), which is stored in the image evaluation unit, with the corresponding currently captured image of the marker 16, wherein the master pattern is modified, distorted and/or shifted with the adopted parameters. That parameter set which achieves the maximum similarity (or the minimum non-similarity) between the modified/distorted/shifted master pattern and the currently captured noise pattern(s) 34 is the parameter set which ultimately finely locates the field(s) 32.

Since a full search means that a plurality of parameter sets need to be tried in cascade loops, the calculation can be accelerated by virtue of a plurality of parallel units running on an FPGA, for example. At first glance, all computing units involve direct access to the captured image data relating to the marker 16. If a bottleneck occurs here, the image data can be copied/duplicated (for example in a plurality of block RAM units within an FPGA) before the computing units use the data. Consequently, the computing units which carry out the similarity calculation need not all access one memory.

The (normalized) correlation coefficient can be used as a similarity measure for determining the parameter set which ultimately locates one or more or all of the fields 32. The normalized correlation coefficient also makes it possible to assess the current quality of the matching, that is to say how well/reliably a currently evaluated field has been located.

During the full search, the maximum of the similarity measure is represented in order to find the appropriate parameter set representing the position of the field 32. The value of the maximum itself can be used as a measure of the quality with which a particular field is located. This value can also be transformed, for example, into a weighting factor which can be used in an estimation step when determining the position of the marker 16 in space. More reliably located fields 32 are taken into account more than more unreliable fields with this approach.

Since there are a plurality of degrees of freedom for the full search, the calculation is still very complicated.

A distorted coordinate is desirably calculated for each pixel within the noise pattern 34, for example using a calculation similar to the following calculation which is disclosed in the article by R. Hartley and A. Zisserman: Multiple View Geometry, Tutorial, CVPR, June 1999:

$$x' = \frac{x'_1}{x'_3} = \frac{h_{11}x + h_{12}y + h_{13}}{h_{31}x + h_{32}y + h_{33}}, \quad y' = \frac{x'_2}{x'_3} = \frac{h_{21}x + h_{22}y + h_{23}}{h_{31}x + h_{32}y + h_{33}}$$

There is one degree of freedom for the normalization in the above projection transformation equations. In this case, it is possible to investigate whether all parameters of the projection transformation have to be modified during the search. Such investigations can show that the practice of fixing some parameters (taking into account the result of the coarse determination) achieves sufficiently good results, while this greatly reduces the computing complexity that is involved.

Another option is to investigate a linearization of the projection equation, which can result in a more efficient solution. This means that the coordinate of a projected point can be calculated more efficiently in a small search area around the coarsely determined parameters obtained from the coarse determination.

Another possible way of reducing the computing complexity is to choose an approach in which the search is first of all carried out on an image of the marker 16 in the camera with a lower resolution, in which case the search is then refined on the same image with a higher resolution. The prior knowledge from the results of the lower-resolution image can be used to limit the search areas in the steps for locating the field(s) 32 in the higher-resolution image.

According to another exemplary embodiment, instead of using the correlation coefficient which is calculated as a similarity measure on the basis of the image data, it is possible to choose an approach which is based on a census transform in order to accelerate the localization of the field(s) 32. The census transform is described, for example, in the article by Fridtjof Stein: Efficient Computation of Optical Flow Using the Census Transform, Proceedings of the 26th DAGM Symposium, 2004, pages 79-86.

The fine determination (process step 38) for exactly locating the fields 32 of the marker 16 on the basis of the noise patterns 34 is particularly precise if, as already mentioned, the noise patterns have a high bandwidth in the frequency domain. The size of the bandwidth of the noise patterns directly determines the accuracy of the system 10. Noise patterns with white noise have a narrow autocorrelation function, ideally a 2-dimensional delta pulse, and are therefore optimally suitable for correlation-based block matching methods in order to locate the fields 32.

Noise patterns having full-frequency, that is to say very broadband, content enable a good estimation of blurring of the image, which is caused by movement, for speed estimations. That is to say, the frequency content of the image is determined only by the imaging behavior of the camera and by movement-related blurring.

If the fields 32 have straight lines as an edge, as shown in FIG. 1, an efficient coarse preliminary estimation of the projection parameters and marker position candidates is enabled. An ellipse fit, as is desired for circular fields, is not required here. Instead, it is possible to use Radon/Hough transform-type analyses in order to find the lines and field position candidates. Additionally or alternatively, the corners can be analyzed in order to find the frames or edges of the field(s). Mathematically speaking and from the point of view of accuracy, an ellipse fit may be better, but Radon/Hough transform-type analyses and/or corner detections can be efficiently implemented in hardware/FPGA. A Radon transform calculation can be efficiently carried out by considering the so-called "central slice theorem" or "projection slice theorem".

Figure 6:
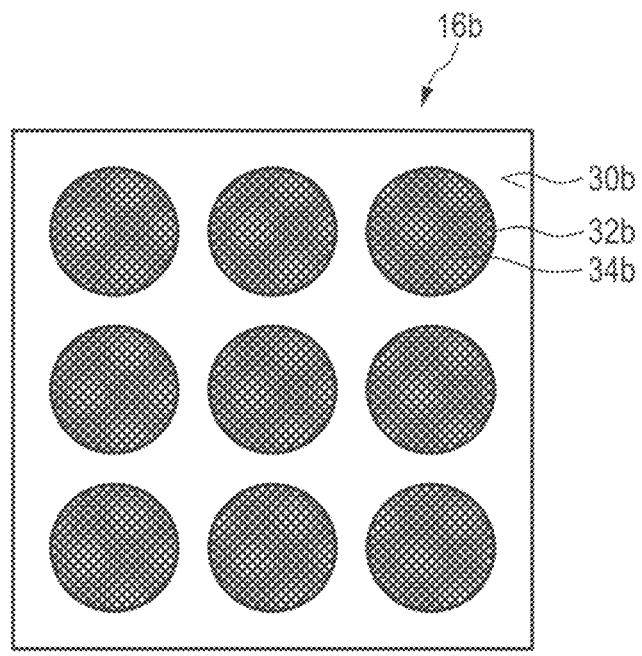
FIG. 6 shows yet another exemplary embodiment of a marker for determining the position of a movable object.

According to another exemplary embodiment of a marker 16b, which is shown in FIG. 6, the marker 16b may have circular fields 32b into which the surface 30b of the marker 16b is subdivided. Like in the marker 16 and the marker 16a, the fields 32b are each filled with a statistical noise pattern 34b, in which case reference can be made to the description of the noise patterns 34 of the marker 16 with regard to the configuration of the noise patterns 34b.

In the case of the marker 16b, the high accuracy with which the position of the marker 16b is determined can be achieved on account of the noise patterns 34b with a high bandwidth. The use of circular or else elliptical fields 32b can be advantageous since, even with projective distortion, a circular shape results in a circular/elliptical shape, whereas the high measurement accuracy is achieved by the statistical noise patterns within the fields 32b.

The position and/or orientation of the marker 16b can be coarsely determined via standard circle or ellipse detection methods. The detected ellipse parameters or the corresponding list of coordinates can be used to calculate the position in addition to the results from the fine localization of the noise patterns 34b.

Figure 7:
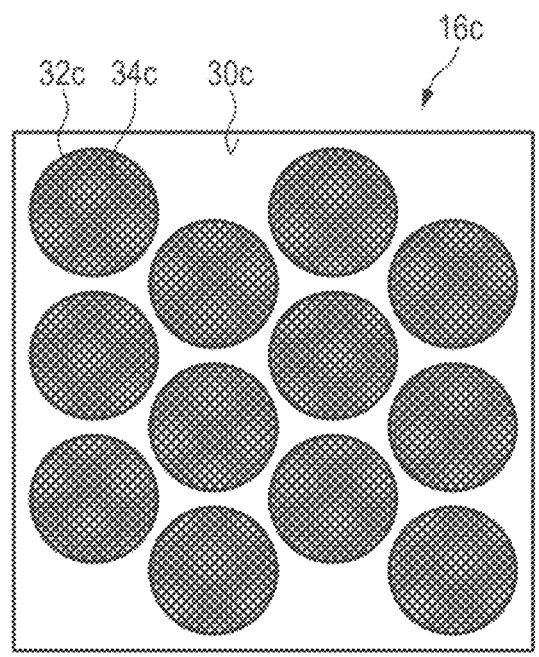
FIG. 7 shows yet another exemplary embodiment of a marker for determining the position of a movable object, wherein the marker is modified in comparison with FIG. 6.

In the case of the marker 16c having circular (or elliptical) fields 32b, the surface occupancy or the degree of filling of the surface 30c of the marker 16c can be increased according to the exemplary embodiment of a marker 16c in FIG. 7 by not strictly arranging the fields 32c in rows and columns, but rather offsetting them with respect to one another in such a manner that the highest possible surface occupancy of the surface 30c of the marker 16c is achieved. In the arrangement according to FIG. 6, twelve fields 32c, for example, find space on the surface 30c, instead of only nine fields 32b, with the same size of the fields 32c and 32b.

The increase in the degree of filling of the surface 30c and therefore the increase in the number of fields which are filled with statistical noise patterns means that there are more observation pixels. An increase in the number of observation pixels in the fields reduces the standard deviation when locating the fields 32c.

A further aspect is described below with reference to FIGS. 8 and 9.

Figure 8:
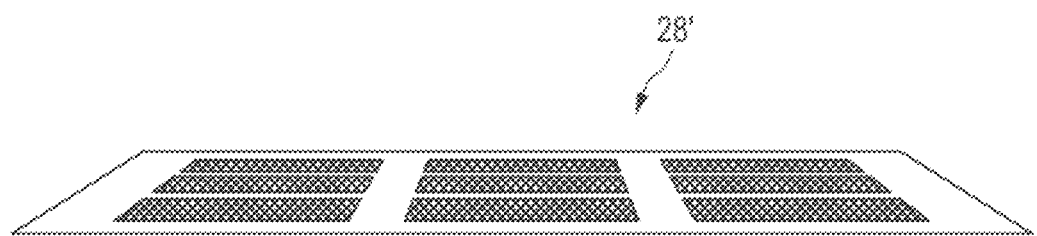
FIG. 8 shows an image of a marker, which is captured by an image capture unit of the system in FIG. 1, in the case of a grazing viewing direction of the image capture unit with respect to the marker.

FIG. 8 shows an image 28', comparable to the image 28 in FIG. 2, of the marker 16 on the object 12, but the camera 20 now captures the marker 16 with strongly grazing incidence of the viewing direction. The result is that the image 28' of the marker 16 has severe projection distortion on the image sensor 22 of the camera 20. This means that at least parts of the image 28' are sampled at a lower spatial sampling rate.

This reduced sampling rate on account of severe projection distortion of the marker 16 results in so-called "aliasing", in particular when the bandwidth of the frequency of the noise in the noise patterns is maximized, as is preferred within the scope of the present disclosure. Aliasing is an effect and, in the field of signal analysis, denotes errors which occur when frequency components which are higher than half the sampling frequency occur in the signal to be sampled. Aliasing results in poor or even completely incorrect localization or position determination of the fields 32 in the image 28' and therefore in an unusable position determination of the marker 16.

Since aliasing occurs already during image formation, it cannot be reversed in the image evaluation unit 26. However, this can be addressed in the structure of the system 10. The bandwidth of the noise patterns is desirably limited, with the result that aliasing does not occur for projection distortions which are not too severe.

For very severe projection distortions, the position measurement results are very uncertain—at least for some degrees of freedom. The threshold for what is "excessively severe" projection distortion is desirably determined during system development. This can be addressed, for example, by virtue of the image capture unit 18 having a plurality of cameras 20 which observe the marker 16 in different viewing directions, and/or a plurality of markers 16 can be applied to the object 12 in a distributed manner. If there are a plurality of cameras, they should be arranged in such a manner that at least one camera always observes a noise pattern 34 with a sufficiently high sampling rate, with the result that aliasing is avoided or is small enough. If a plurality of markers 16 are used, they can be arranged in such a manner that at least one of the markers 16 is observed by the camera 20 without excessively great projection distortion.

Another possible way of avoiding aliasing is to limit the frequency band (in principle an anti-aliasing filter). This can be achieved, for example, by virtue of the optics of the camera 20 (lens 24) being deliberately defocused. Another possibility is to generate the noise patterns 34 by subjecting white noise to low-pass filtering.

The band limitation by subjecting the noise pattern to low-pass filtering during its generation is advantageous (for reducing aliasing effects). This is because, in this procedure, there is better control over the filter, which is applied to the noise pattern 34, in comparison with the filtering via optics adjustment while recording the marker 16 using the camera 20. Control over the filter, which is applied to the noise pattern during its generation, is advantageous since the filter applied to the noise pattern determines the autocorrelation function of the resulting noise pattern. A good trade-off between sufficient low-pass filtering and the maintenance of a narrow autocorrelation function can be achieved thereby.

Figure 9:
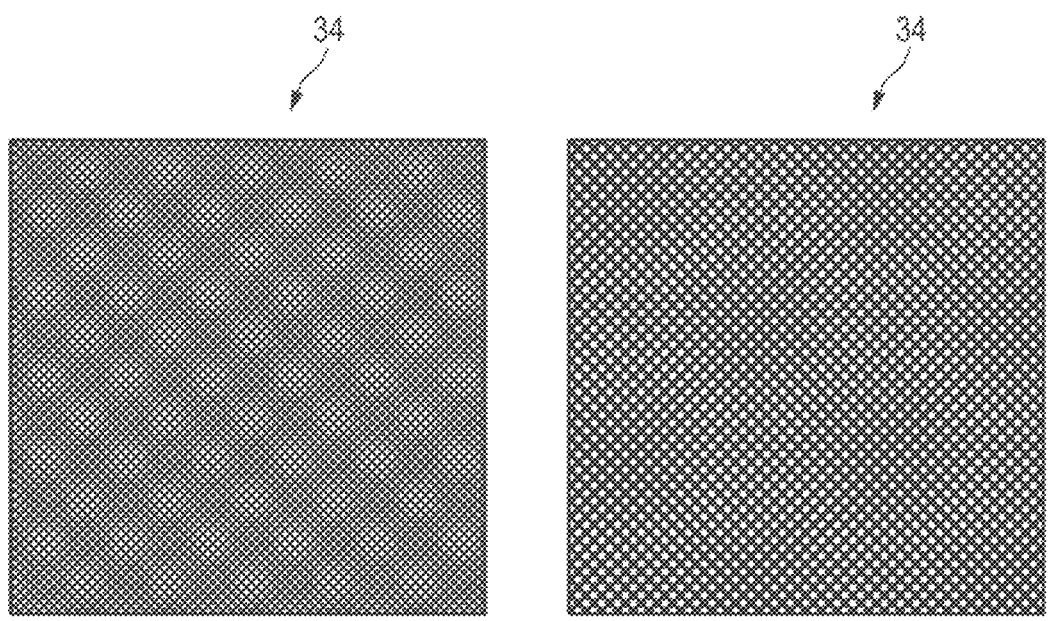
FIG. 9 shows two noise patterns of a marker, wherein the left-hand noise pattern is unfiltered and the right-hand noise pattern has been subjected to low-pass filtering.

FIG. 9 shows, on the left, an example of a statistical noise pattern 34 without low-pass filtering during generation, whereas FIG. 8 shows, on the right, the noise pattern 34 with low-pass filtering. In this case, a 2D binomial filter, for example, can be used to smooth the noise pattern 34.

An alternative filter may be a filter which results in a rotationally symmetrical autocorrelation function $e^{\wedge}(-\lambda \ast sqrt(x2+y2))$. $\lambda$ determines the "narrowness" of the autocorrelation function which relates to the bandwidth in the frequency domain. The coordinates x and y are the spatial coordinates in the image plane.

Anti-aliasing can be directed not only to the noise patterns 34, but also to the edges of the fields 32 and/or the edges of the marker 16 itself, since aliasing effects can also occur there.

What is claimed is:

1. A system configured to determine a six dimensional position of an object that is movable with six degrees of freedom of movement in space, the system comprising:
   a marker configured to be applied to the object, the marker comprising a surface that is subdivided into a plurality of individual fields, each field having a statistical noise pattern;
   an image capture unit configured to capture an image of the object to provide an image of the marker, the image capture unit being remote from the object, the image capture unit comprising a plurality of cameras configured to observe the marker at different viewing angles; and
   an image evaluation unit configured to: a) store a reference image of the noise patterns; and b) locate a field in the image of the marker by comparing the image of the marker and the reference image to determine a current position of the marker in space.

2. The system of claim 1, wherein the fields are polygonal.

3. The system of claim 1, wherein the fields define rows and columns.

4. The system of claim 1, wherein the fields are circular or elliptical.

5. The system of claim 2, wherein the fields are rotated and/or shifted relative to one another.

6. The system of claim 1, wherein the noise patterns are different from one another.

7. The system of claim 1, wherein the noise patterns comprise broadband noise in a frequency domain.

8. The system of claim 1, wherein the noise patterns comprise grayscale patterns.

9. The system of claim 8, wherein a probability density of grayscale values within the noise patterns is a Gaussian distribution.

10. The system of claim 1, wherein the noise patterns comprise white noise.

11. The system of claim 1, wherein the image evaluation unit is configured to coarsely determine the position of the marker by detecting corners and/or edges of at least one member selected from the group consisting of the marker and the fields of the marker.

12. The system of claim 11, wherein the image evaluation unit is configured to finely determine the position of the marker by detecting the noise patterns.

13. The system of claim 1, wherein the image capture unit comprises a low-pass filter and/or a defocusing device.

14. The system of claim 1, wherein the noise patterns are generatable by subjecting white noise to low-pass filtering.

15. A method of determining a six dimensional position of an object that is movable with six degrees of freedom of movement in space, the method comprising:
   providing a marker comprising a surface that is subdivided into a plurality of individual fields, each field comprising a statistical noise pattern;
   storing a reference image of the noise patterns;
   applying the marker to the object;
   capturing an image of the marker on the object via a plurality of cameras which observe the markers at different viewing angles; and
   determining a position of the marker in space by comparing the image of the marker and the reference image, a field being located in the image of the marker.

16. The method of claim 15, wherein determining the current position of the marker comprises coarsely determining the position of the marker by detecting corners and/or edges of at least one member selected from the group consisting of the marker and the fields of the marker.

17. The method of claim 15, determining the current position of the marker comprises finely determining the position of the marker by detecting the noise patterns.

18. The method of claim 17, comprising using low-pass filtering or defocusing to capture the image of the noise patterns.

19. The method of claim 15, comprising subjecting white noise to low-pass filtering to generate the noise patterns.

20. The method of claim 15, comprising capturing the image of the marker from different viewing directions.

21. The method of claim 15, further comprising applying a plurality of markers to the object, and capturing image of the plurality of markers.

22. The method of claim 15, wherein the object comprises a movable machine part.

23. The method of claim 15, wherein the object comprises a movable component of an optical system.

* * * * *

UNITED STATES PATENT AND TRADEMARK OFFICE
CERTIFICATE OF CORRECTION

| | | |
|---|---|---|
| PATENT NO. | : 11,504,855 B2 | Page 1 of 1 |
| APPLICATION NO. | : 16/712131 | |
| DATED | : November 22, 2022 | |
| INVENTOR(S) | : Jan Horn et al. | |

It is certified that error appears in the above-identified patent and that said Letters Patent is hereby corrected as shown below:

On the Title Page

Column 2, Line 13, Item (57), after "position" insert --of--.

Signed and Sealed this
Thirty-first Day of January, 2023

Katherine Kelly Vidal
*Director of the United States Patent and Trademark Office*